(12) United States Patent
Yamamoto et al.

(10) Patent No.: US 9,696,425 B2
(45) Date of Patent: Jul. 4, 2017

(54) OPTICAL DISTANCE MEASURING APPARATUS

(71) Applicant: Hitachi Maxell, Ltd., Osaka (JP)

(72) Inventors: Shoji Yamamoto, Tokyo (JP); Yoshiho Seo, Tokyo (JP)

(73) Assignee: HITACHI MAXELL, LTD., Osaka (JP)

( * ) Notice: Subject to any disclaimer, the term of this patent is extended or adjusted under 35 U.S.C. 154(b) by 271 days.

(21) Appl. No.: 14/242,908

(22) Filed: Apr. 2, 2014

(65) Prior Publication Data

US 2014/0300887 A1    Oct. 9, 2014

(30) Foreign Application Priority Data

Apr. 5, 2013  (JP) ................................ 2013-079114

(51) Int. Cl.
*G01C 3/08* (2006.01)
*G01S 17/08* (2006.01)
(Continued)

(52) U.S. Cl.
CPC ............ *G01S 17/08* (2013.01); *G01S 7/4808* (2013.01); *G01S 7/4868* (2013.01); *G01S 7/497* (2013.01); *G01S 17/42* (2013.01)

(58) Field of Classification Search
CPC ........ G01S 7/483; G01S 7/497; G01S 7/4868; G01S 17/89; G01S 17/023; G01S 17/42
(Continued)

(56) References Cited

U.S. PATENT DOCUMENTS 5,552,893 A * 9/1996 Akasu .................. G01C 3/00
                                                356/4.01
2001/0002860 A1* 6/2001 Ohishi .................. G01C 3/08
                                                356/5.01
(Continued)

FOREIGN PATENT DOCUMENTS

CN    102314265 A    1/2012
CN    102460209 A    5/2012
(Continued)

OTHER PUBLICATIONS

European Search Report for European Application No./Patent No. 14163155.6-1812, issued on Aug. 12, 2014.
(Continued)

*Primary Examiner* — Mark Hellner
(74) *Attorney, Agent, or Firm* — Baker Botts L.L.P.

(57) ABSTRACT

An optical distance measuring apparatus including a light source, a variable mirror scanning the light on an object, a receiving device receiving light from the object, a detected signal amplifying unit detecting a light receiving signal obtained by the receiving device, an amplification control unit detecting a set target value of light sensitivity of the receiving device or sets the light sensitivity based on a light quantity of reflected light, and a distance calculation unit detecting a flight time of the ranging light from a light emitting signal and calculating a distance up to the object, wherein in a first scan period, the amplification control unit detects the set target value based on a light quantity of the reflected light, and in a second scan period, the amplification control unit sets sensitivity of the receiving device to the set target value and the distance calculation unit calculates the distance.

9 Claims, 13 Drawing Sheets

(51) Int. Cl.
G01S 17/42 (2006.01)
G01S 7/48 (2006.01)
G01S 7/486 (2006.01)
G01S 7/497 (2006.01)

(58) Field of Classification Search
USPC .................................................... 356/5.01
See application file for complete search history.

(56) References Cited

U.S. PATENT DOCUMENTS

| | | | | |
|---|---|---|---|---|
| 2002/0143506 | A1* | 10/2002 | D'Aligny | G01B 11/002 |
| | | | | 703/6 |
| 2009/0268193 | A1* | 10/2009 | Ohishi | G01C 15/002 |
| | | | | 356/5.01 |
| 2010/0315618 | A1* | 12/2010 | Hertzman | G01S 7/483 |
| | | | | 356/5.01 |
| 2012/0002215 | A1 | 1/2012 | Takahashi | |
| 2012/0140203 | A1* | 6/2012 | Gusev | G01S 7/489 |
| | | | | 356/5.01 |

FOREIGN PATENT DOCUMENTS

| | | |
|---|---|---|
| EP | 1 942 354 A1 | 7/2008 |
| JP | 05-062883 U | 8/1993 |
| JP | 2010-286448 A | 12/2010 |
| JP | 2011-089874 A | 5/2011 |
| JP | 2011-516829 A | 5/2011 |
| WO | WO 2006/077588 | 7/2006 |
| WO | WO 2009/115122 | 9/2009 |

OTHER PUBLICATIONS

Office Action, mailed Dec. 30, 2015, which issued during the prosecution of Chinese Patent Application No. 201410133953.5, which corresponds to the present application (Brief English translation attached).

Office Action, mailed Jun. 21, 2016, which issued during the prosecution of Chinese Patent Application No. 201410133953.5, which corresponds to the present application (Brief English translation attached).

Office Action, mailed Aug. 30, 2016, which issued during the prosecution of Japanese Patent Application No. 2013-079114, which corresponds to the present application.

Communication Pursuant to Article 94(3) EPC, dated Feb. 14, 2017, which issued during the prosecution of European Patent Application No. 14 163 155.6, which corresponds to the present application.

* cited by examiner

OPTICAL DISTANCE MEASURING APPARATUS

INCORPORATION BY REFERENCE

The present application claims priority from Japanese patent application JP-2013-079114 filed on Apr. 5, 2013, the contents of which are hereby incorporated by reference into this application.

BACKGROUND OF THE INVENTION

The present invention relates to an optical distance measuring apparatus that irradiates ranging light such as laser light on a measuring object, receives light reflected from the measuring object, and measures a distance up to the measuring object, and further, to a light receiving circuit configuration and a range finding control method.

Conventionally, as one of distance measurement methods, known is a distance measurement method of a TOF (Time of Flight) system for irradiating laser light on a ranging object, receives laser light reflected from the ranging object, and finds a time difference from an irradiation time of laser to a light receiving time of the reflected laser light to find a distance up to the ranging object. In the laser range finding apparatus, it is necessary to receive reflected laser light with high sensitivity. In some light receiving elements, a high-sensitivity photo diode called APD (Avalanche Photo Diode) is adopted.

The APD is a photo diode in which a phenomenon called an avalanche multiplication is used to improve light sensitivity. However, in the APD, a change in a multiplication factor may be large due to a change in a temperature to cause a distance detection error. JP-A-2010-286448 discloses a technique of an optical distance measuring apparatus that controls a multiplication factor due to a change in a temperature of the APD and performs temperature compensation for reducing a detection error.

SUMMARY OF THE INVENTION

According to the optical distance measuring apparatus disclosed in JP-A-2010-286448, since a multiplication factor is controlled and compensated due to a change in a temperature of the APD, a detection error of the optical distance measuring apparatus can be reduced. However, when reflectances of a measuring object are different, intensity of reflected light is different. Therefore, it is difficult to realize high distance measurement accuracy with respect to the measuring object that has surfaces with different reflectances even at the same distance.

Further, an amplifier is used in a post-stage circuit for amplifying a weak signal of a light receiving element, and an offset is caused by the amplifier. A capacitor is used in order to remove the offset. However, there is a problem that the capacitor has a large influence on the distance measurement accuracy in a circuit configuration in which due to the intensity of the reflected light, an offset level changes and a voltage of a light receiving signal and a reference voltage are compared to output pulses. For the purpose, there is a problem that light receiving signal levels are conformed to each other and a difference in light receiving intensity is suppressed in a stage previous to an input to a post-stage amplifier.

An optical distance measuring apparatus according to an embodiment of the present invention for irradiating ranging light on a measuring object and receiving light reflected from the measuring object to measure a distance up to the measuring object, comprising a light source that emits ranging light, a variable reflection angle mirror that scans the ranging light on the measuring object, a light receiving device that receives light reflected from the measuring object of the ranging light, a detected signal amplifying unit that detects a light receiving signal obtained by the light receiving device, an amplification factor control unit that detects a set target value of light sensitivity of the light receiving device or sets the light sensitivity of the light receiving device on a basis of a light quantity of reflected light detected by the detected signal amplifying unit, and a distance calculation unit that detects a flight time of the ranging light from a light emitting signal detected by the detected signal amplifying unit and calculates a distance up to the measuring object, wherein in a first scan period, the amplification factor control unit detects the set target value of the light receiving device on a basis of a light quantity of the reflected light detected by the detected signal amplifying unit, and in a second scan period, the amplification factor control unit sets sensitivity of the light receiving device to the set target value detected in the first scan period and the distance calculation unit calculates a distance up to the measuring object.

Further, according to another embodiment of the present invention, the detected signal amplifying unit includes an amplifier and/or an offset removal unit, or the amplification factor control unit includes a differentiation circuit.

According to the present invention, the highly-accurate optical distance measuring apparatus is provided regardless of a reflectance of the measuring object.

Other objects, features and advantages of the invention will become apparent from the following description of the embodiments of the invention taken in conjunction with the accompanying drawings.

BRIEF DESCRIPTION OF THE D WINGS

DESCRIPTION OF THE EMBODIMENTS

Hereinafter, embodiments about a distance measurement principle, a configuration, and a driving method therefor of an optical distance measuring apparatus of the present invention, in which a laser is applied to a light source and an APD is applied to a light receiving element will be described with reference to drawings.

First Embodiment

Figure 1A:
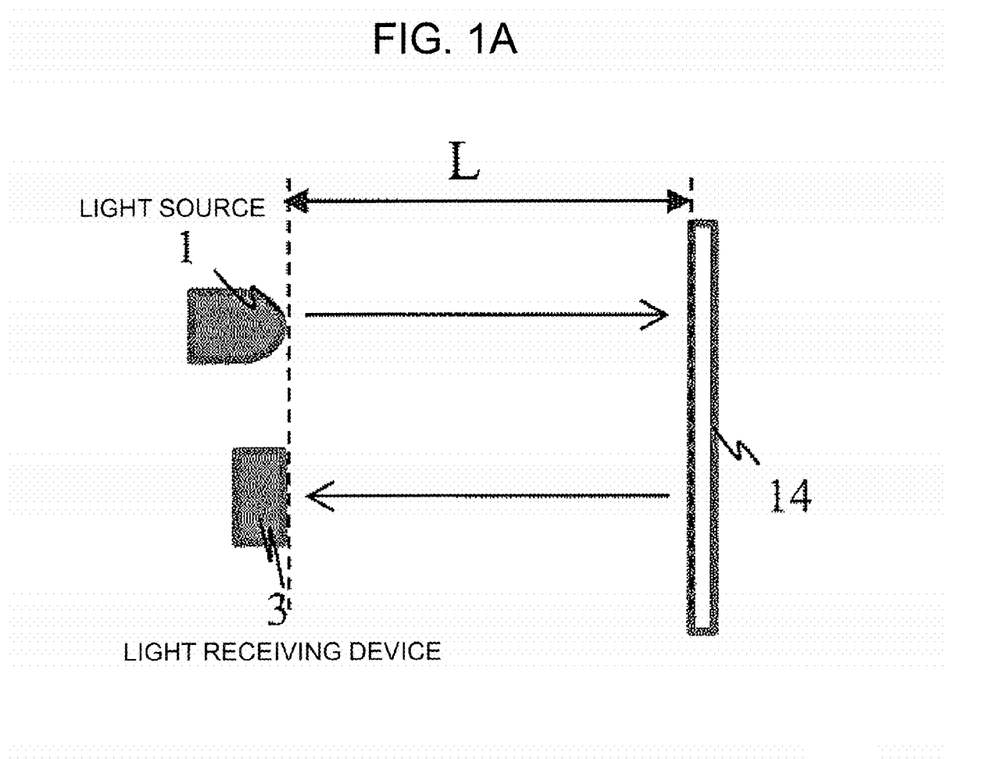
FIG. 1A illustrates a distance measurement principle according to an embodiment of the present invention.
Figure 1B:
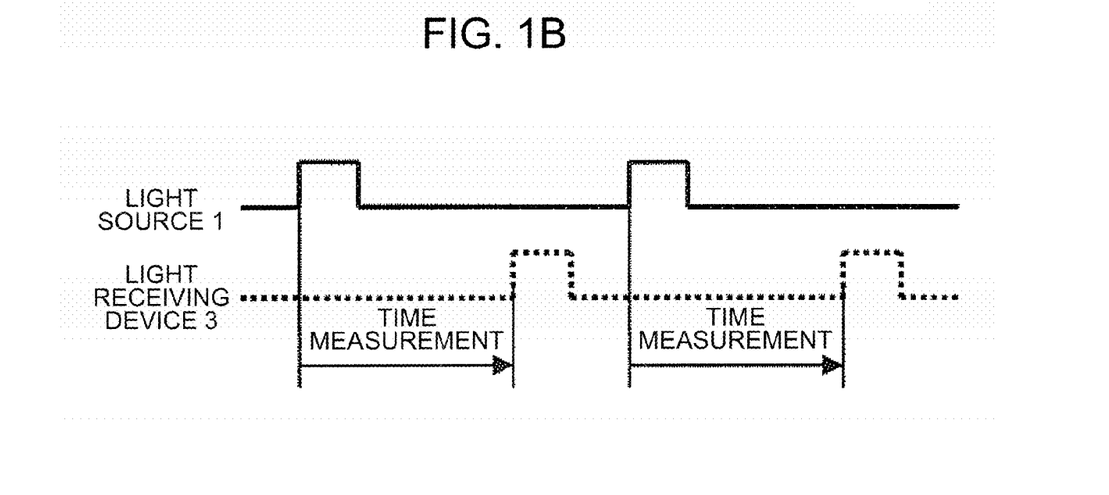
FIG. 1B illustrates an operation timing of a distance measurement according to the embodiment of the present invention.

FIGS. 1A and 1B illustrate the distance measurement principle of the present embodiment. As shown in FIGS. 1A and 1B, a TOF (Time of Flight) system is described in which a measurement is performed by a difference between an emission time of light from a laser light source 1 and a light receiving time of light in a light receiving device 3 of light reflected from an object 14. Light emitted from the laser light source 1 is irradiated on the object 14. The light irradiated on the object 14 is scattered and part of light is detected by the light receiving device 3. When the time difference is set to t [s], a distance L [m] is represented by the following formula (1) on the basis of a velocity of light $3.0 \times 10^8$ [m].

$$L[m] = \text{velocity of light } 3.0 \times 10^8 [m] \times t[s]/2 \qquad (1)$$

By calculating a distance in accordance with the above-described formula (1), the optical distance measuring apparatus is realized.

Figure 2:
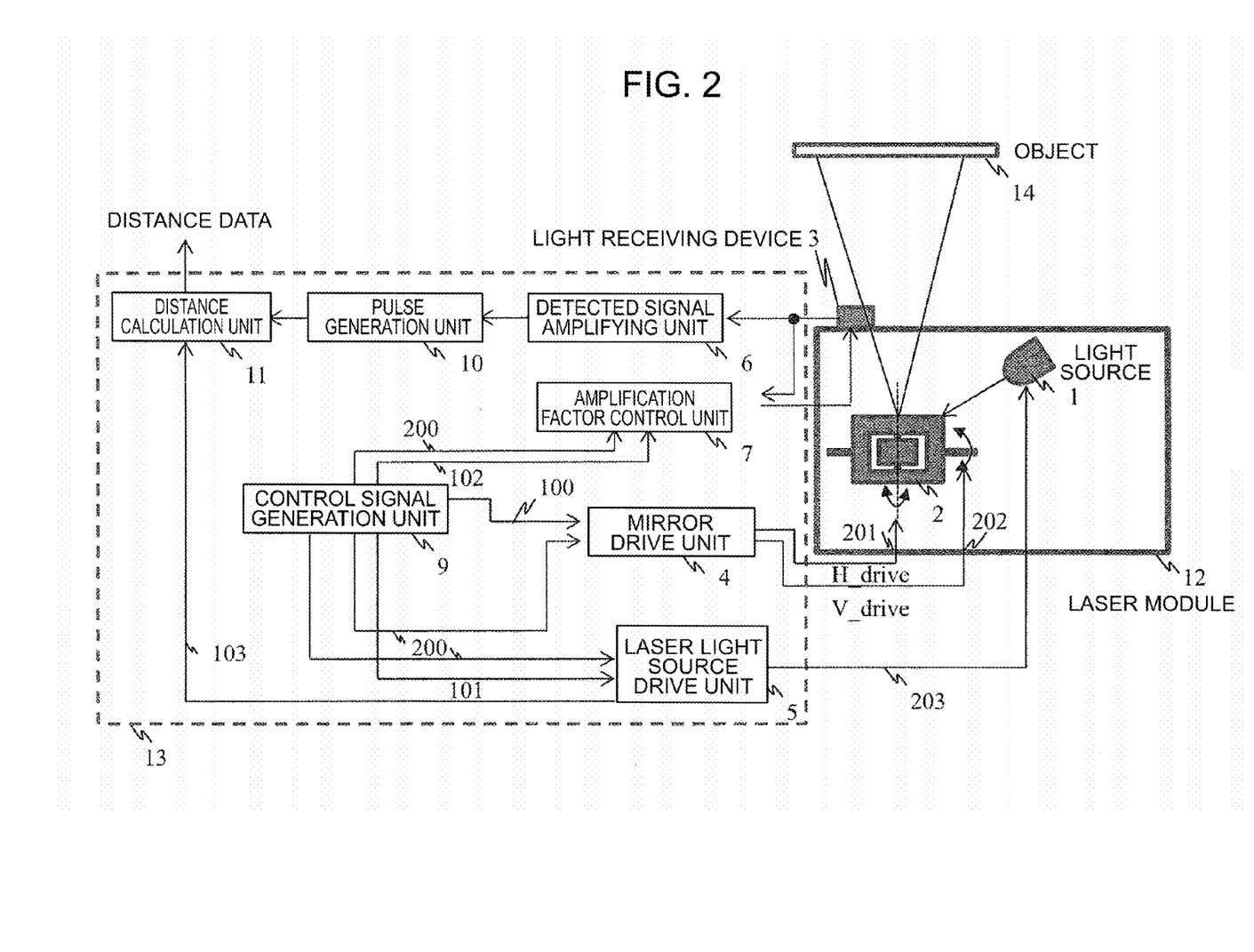
FIG. 2 illustrates a configuration according to the embodiment of the present invention.

Next, referring to FIG. 2, a configuration of the optical distance measuring apparatus and a driving method therefor will be described.

The optical distance measuring apparatus is configured by a laser module 12 and a driving board 13. The laser module 12 includes the laser light source 1, a variable reflection angle mirror 2, and the light receiving device 3. The driving board 13 includes a mirror drive unit 4, a laser light source drive unit 5, a detected signal amplifying unit 6, an amplification factor control unit 7, a control signal generation unit 9, a pulse generation unit 10, and a distance calculation unit 11. The light receiving device 3 is arranged in the outside of a chassis of the laser module 12; however, it is not limited thereto. The light receiving device 3 may be arranged in the inside of the laser module 12 by using a lens and a mirror. The light receiving device 3 may have a configuration capable of receiving light.

Next, operations of the driving board 13 will be described.

The control signal generation unit 9 of the driving board 13 generates a mirror drive unit control signal 100, a laser light source drive unit control signal 101, a bias voltage control signal 102, and a synchronous signal 200. The laser light source drive unit control signal 101 and the synchronous signal 200 are input to the laser light source drive unit 5. The laser light source drive unit 5 generates a laser driving signal 203 in accordance with the input laser light source drive unit control signal 101 and synchronous signal 200. Further, the laser light source drive unit 5 adjusts a light quantity of the laser light source 1 on the basis of a signal level of the laser driving signal 203 and an applied time thereof. Further, the mirror drive unit control signal 100 and the synchronous signal 200 are input to the mirror drive unit 4. The mirror drive unit 4 generates a horizontal direction driving signal 201 and a vertical driving signal 202 in accordance with the mirror drive unit control signal 100 and the synchronous signal 200. The horizontal direction driving signal 201 and the vertical driving signal 202 control an angle in a horizontal direction and that in a vertical direction of the variable reflection angle mirror 2, respectively. The bias voltage control signal 102 and the synchronous signal 200 are input to the amplification factor control unit 7. The amplification factor control unit 7 applies a bias voltage to the light receiving device 3 in accordance with the bias voltage control signal 102 and the synchronous signal 200.

On the basis of the above-described circuit operations of the driving board 13, a light quantity of the laser light source 1 and an angle of the variable reflection angle mirror 2 are adjusted to scan laser. Note that in FIG. 1A, only one laser light source 1 is described; further, a plurality of lasers can be used and scanned.

On the other hand, in terms of the light receiving device 3 side, a signal reflected from the object 14 and detected by the light receiving device 3 is input to the detected signal amplifying unit 6 and the amplification factor control unit 7. A signal from the detected signal amplifying unit 6 is input to the pulse generation unit 10. The detected signal amplifying unit 6 amplifies a minute signal. The pulse generation unit 10 compares an input signal and a reference voltage, and converts an analog signal to a pulse. In accordance with a time difference between the pulse generated by the pulse generation unit 10 and a laser pulse emission timing signal 103 from the laser light source drive unit 5, distance data is output by the distance calculation unit 11.

On the basis of the above-described circuit operations of the driving board 13, a light quantity of the laser light source 1 and an angle of the variable reflection angle mirror 2 are adjusted to scan laser. Note that in FIG. 1A, only one laser light source 1 is described; further, a plurality of lasers can be used and scanned.

As described above, the distance measurement principle, the configuration, and the driving method therefor according to the present embodiment are described.

Hereinafter, a specific driving method according to the present embodiment and problematical points caused by characteristics of the APD, a detection signal process circuit, and a method for processing a circuit will be described.

First, characteristics of the APD will be described.

Figure 3:
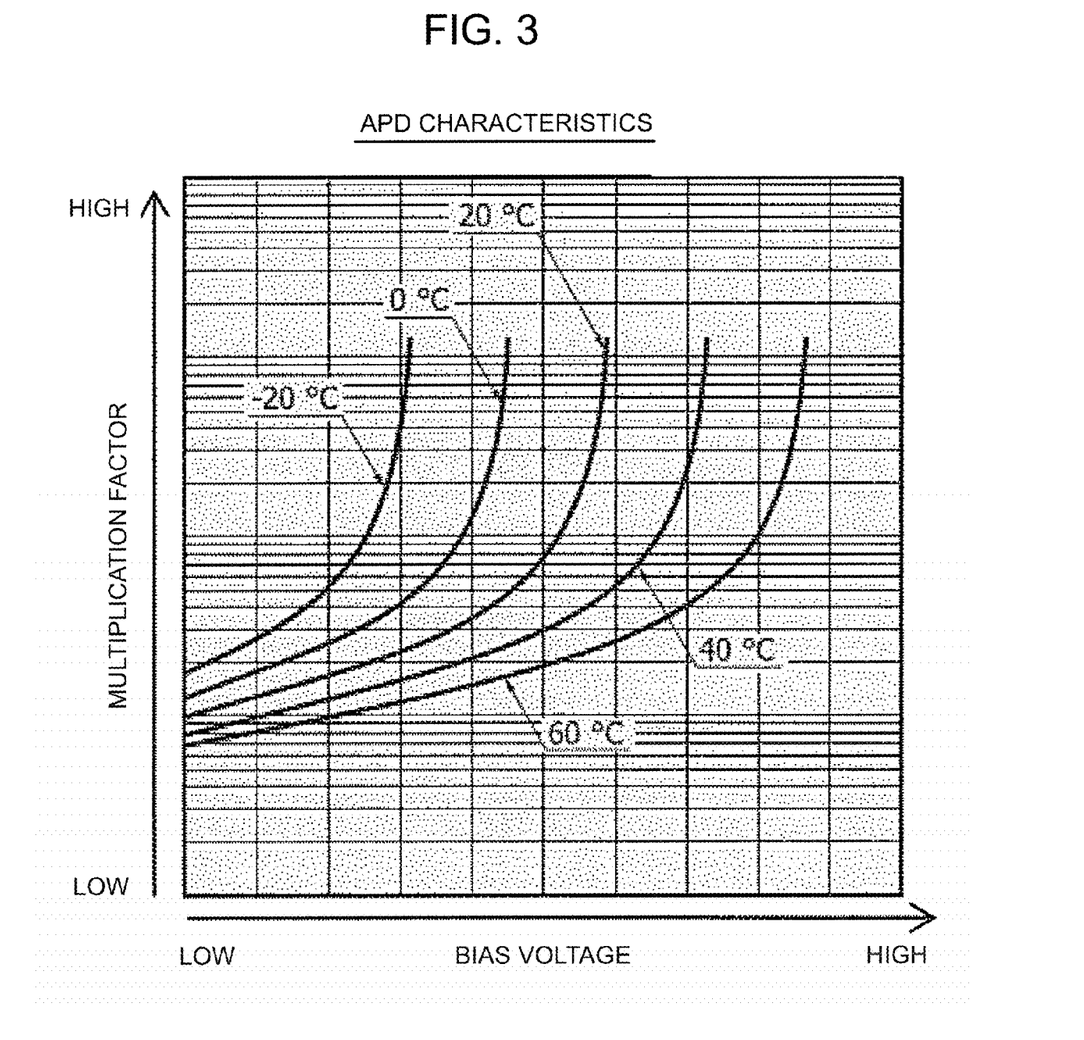
FIG. 3 illustrates a relationship between a bias voltage and a multiplication factor in each temperature of an APD.

FIG. 3 illustrates a relationship between a bias voltage and a multiplication factor for each temperature of the APD. As the bias voltage is higher, the multiplication factor becomes larger, and the multiplication factor exponentially increases from the certain bias voltage. Even in the same bias voltage, as the temperature is lower, the multiplication factor is larger. In the optical distance measuring apparatus disclosed by JP-A-2010-286448, for setting the multiplication factor to be constant, a change in the multiplication factor due to the temperature of the APD is controlled by the bias voltage.

Next, the detection signal process circuit will be described.

Figure 4:
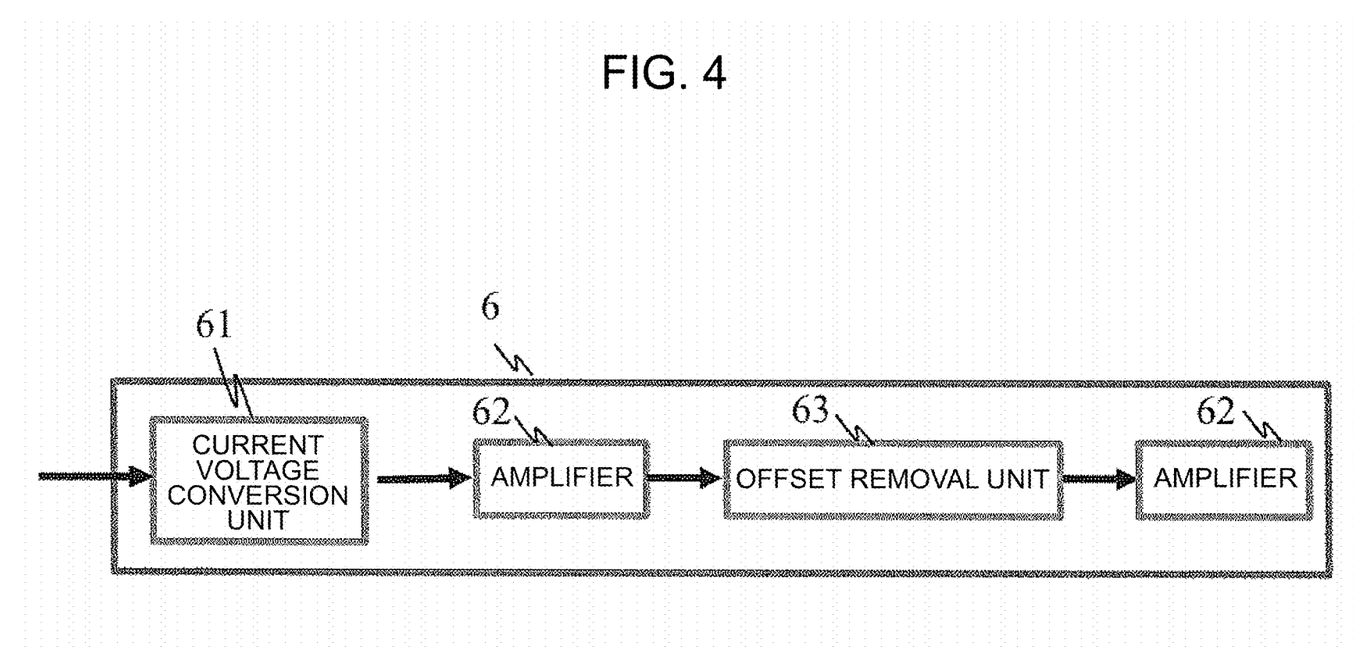
FIG. 4 illustrates a configuration of a detected signal amplifying unit 6.

FIG. 4 illustrates a configuration of the detected signal amplifying unit 6.

The detected signal amplifying unit 6 includes a current voltage conversion unit 61 that converts to a voltage a current generated by light incident to the light receiving device 3, an amplifier 62 that amplifies a minute voltage, and an offset removal unit 63 that removes an offset component of the amplifier. In the amplifier 62 and the offset removal unit 63, an order may be replaced, for example, as in the offset removal unit→the amplifier. Alternatively, a plurality of blocks may be used as in the amplifier→the offset removal unit→the amplifier→the offset removal unit. The order may be flexibly changed in accordance with necessary effects.

Figure 5:
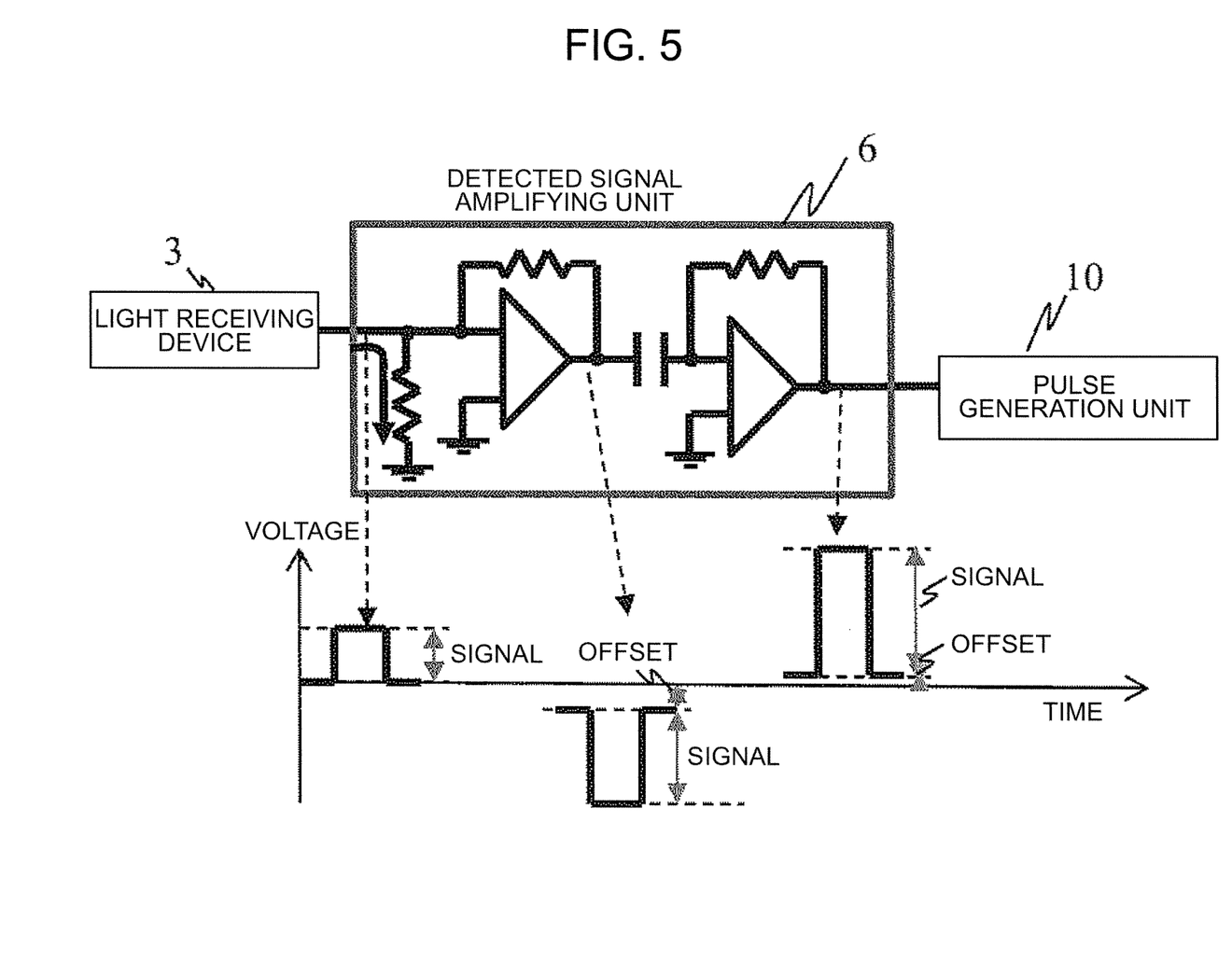
FIG. 5 illustrates a detailed circuit configuration of the detected signal amplifying unit 6.

FIG. 5 illustrates a detailed circuit configuration of the detected signal amplifying unit 6.

In an upper stage, a circuit diagram is illustrated and in a lower stage, a voltage corresponding to each position is illustrated.

In the circuit configuration, a current that flows from the light receiving device 3 is converted to a voltage by a resistor and a minute voltage is amplified by the amplifier 62. Further, an offset component generated by the amplifier is removed by a capacitor, and finally the voltage is amplified and a signal is output to the pulse generation unit 10.

Figure 6:
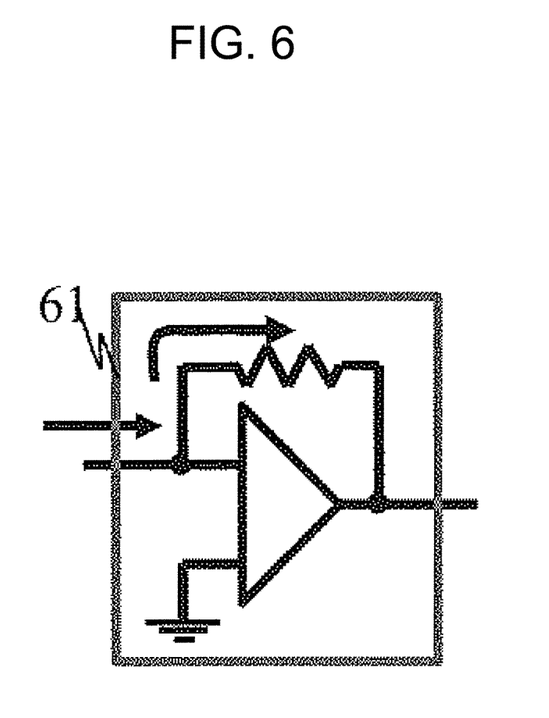
FIG. 6 illustrates a configuration of a current voltage conversion unit 61 using an amplifier.

In FIG. 6, the current voltage conversion unit 61 is configured by an amplifier. In FIG. 5, the current voltage conversion unit 61 is configured by only a resistor, and further may be configured by an amplifier as illustrated in FIG. 6. The current voltage conversion unit 61 may be configured to convert a current to a voltage.

The amplifier 62 may be used as a filter resulting from connecting a capacitor in parallel with a feedback resistor. Further, in the offset removal unit 63, not only a capacitor but also a resistor may be used to form a highpass filter. When the current voltage conversion unit 61, the amplifier 62, and the offset removal unit 63 each have a configuration in which a function is satisfied, a function for improving a performance such as a filter function may be added.

Next, a problematical point caused by a circuit processing method will be described.

Figure 7A:
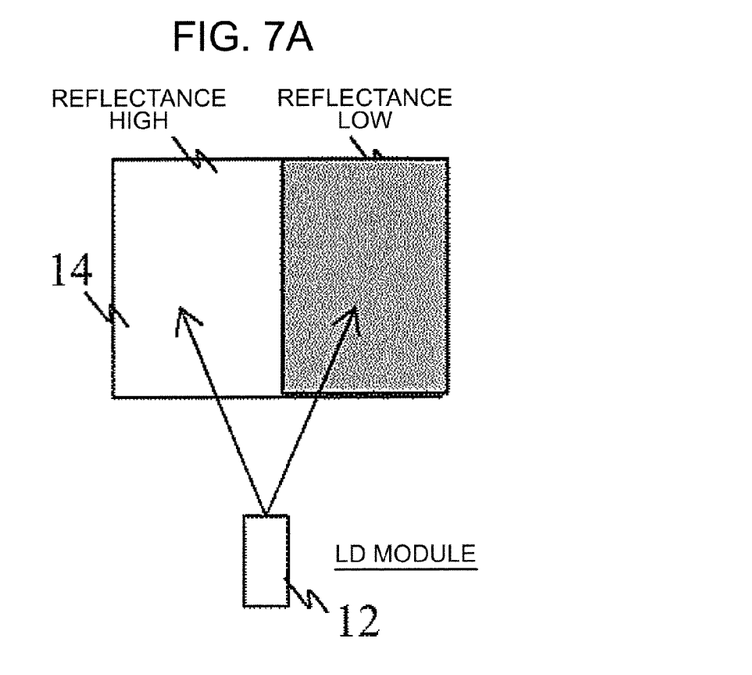
FIG. 7A illustrates an example of a target that has surfaces with different reflectances.
Figure 7B:
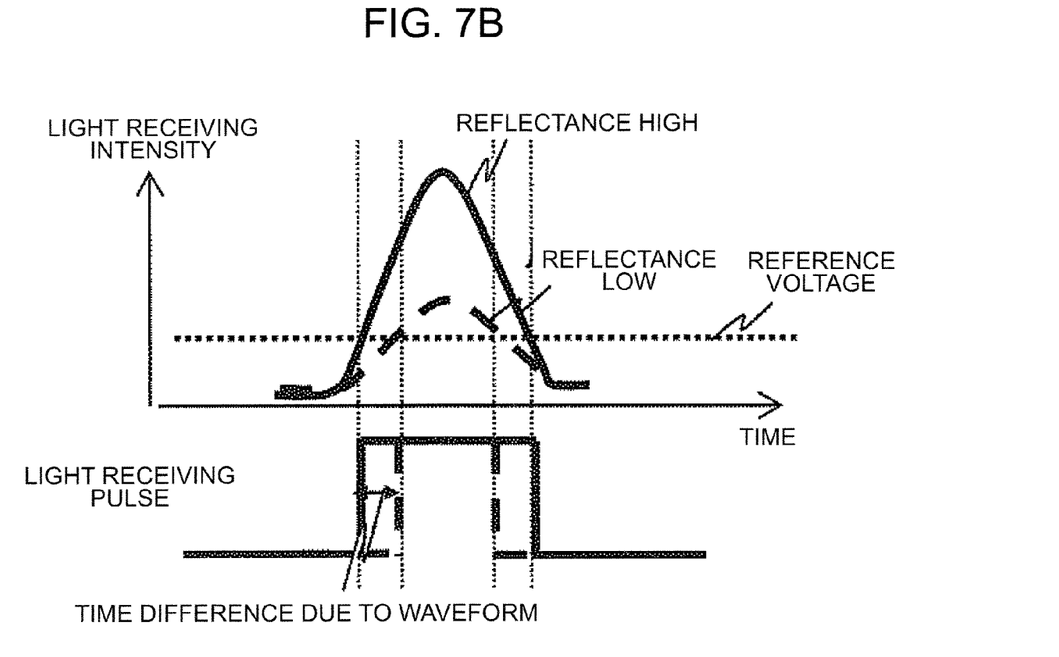
FIG. 7B illustrates a state of light receiving intensity from the target that has surfaces with different reflectances.

FIGS. 7A and 7B illustrate the problematical point caused by the circuit processing method.

In FIG. 7A, light is irradiated from the laser module 12 on the object 14 that has surfaces with different reflectances at the same distance. In FIG. 7B, light receiving intensity of light (hereinafter, referred to as return light) that is detected in the light receiving device 3 from the target 14 is illustrated.

As illustrated in FIG. 7B, since a waveform of a surface with a high reflectance is different in a detection waveform from that of a surface with a low reflectance, a time difference occurs at the time when a pulse is output as compared to a reference voltage. In addition to displacement due to the light receiving intensity, since an amplifier used in a post-stage circuit is different in an offset level due to the light receiving intensity, displacement of pulses is further caused.

Next, a problematical point caused by the amplifier used in the post-stage circuit be described below.

Figure 8A:
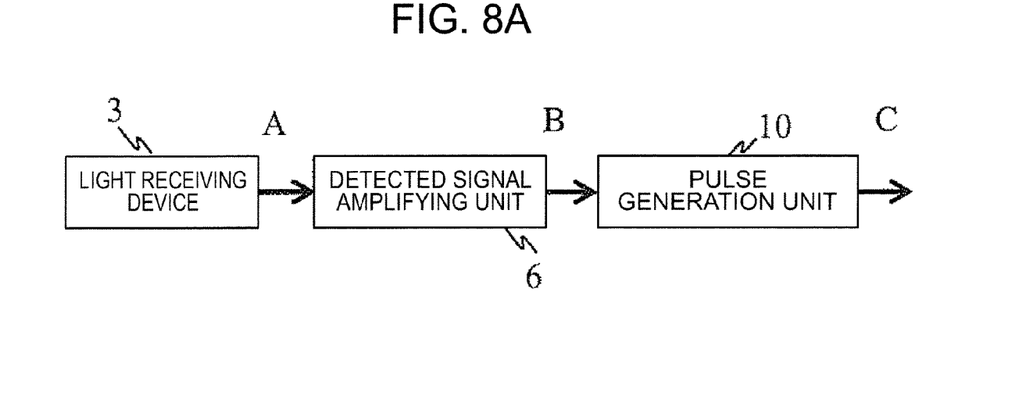
FIG. 8A illustrates a light receiving control configuration of the target that has surfaces with different reflectances.
Figure 8B:
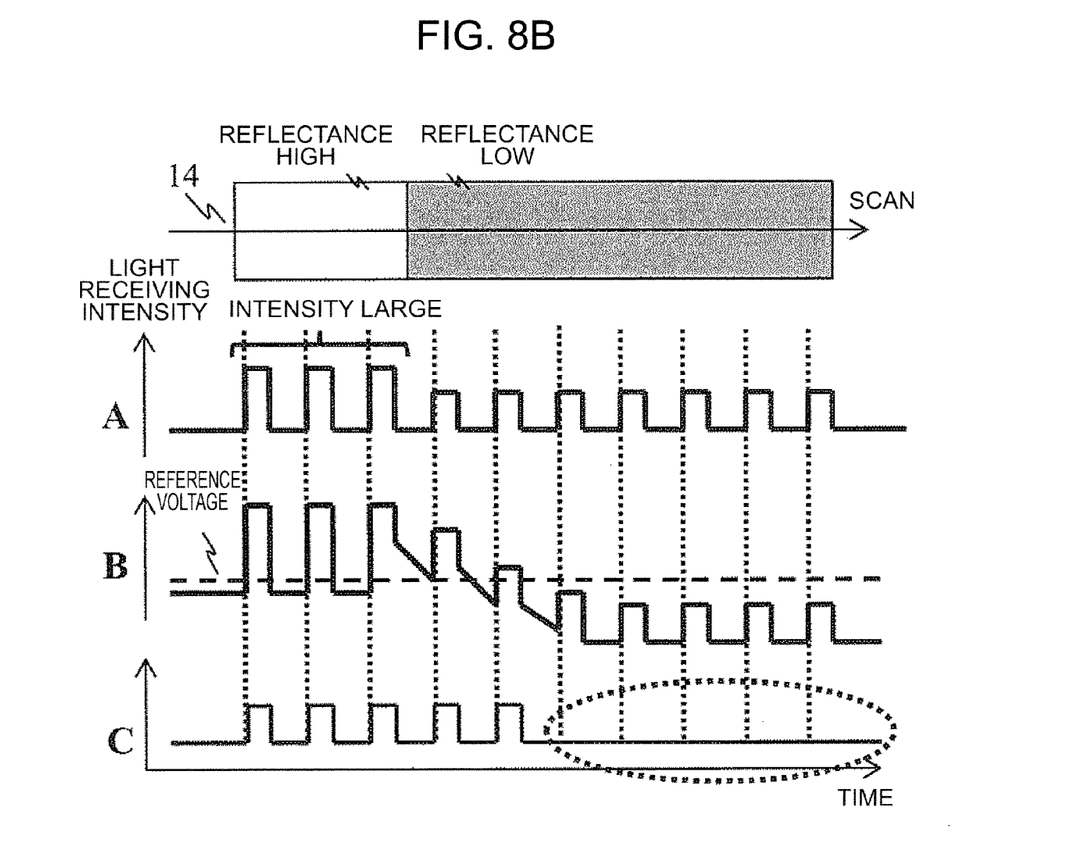
FIG. 8B illustrates transition of each output signal of a light receiving device 3, the detected signal amplifying unit 6, and a pulse generation unit 10.

FIGS. 8A and 8B illustrate a configuration of the light receiving device 3, the detected signal amplifying unit 6, and the pulse generation unit 10, and transition of each output signal. A, B, and C of FIG. 8A illustrate an output from the light receiving device 3, that from the detected signal amplifying unit 6, and that from the pulse generation unit 10, respectively. The pulse generation unit 10 compares an input signal and the reference voltage and performs pulse conversion. Each pulse of A, B, and C at a start of emission corresponds to return light from a surface with a high reflectance, and each pulse in last half corresponds to return light from a surface with a low reflectance.

Here, signals from the surface with a low reflectance are detected as output signals from the light receiving device 3; however, not output from the pulse generation unit 10 because of a change in an offset level. Therefore, it may be difficult to measure a distance in a region with a low reflectance.

As described above, since displacement is caused in an output pulse due to a difference in the detection waveform or intensity from the light receiving device 3, it is necessary to conform light reception levels to each other in a stage where light is detected by the light receiving device 3. A case where reflectances are different at the same distance is described as an example; however, the above-described problem is not limited to this case but arises when a difference in the light quality is present. For example, there is a problem that arises because of a different light quantity even in a case where a distance is different.

Next, a specific driving method of the present embodiment will be described. In the descriptions, a method for differentiating a signal taken from the light receiving device 3, controlling a bias voltage on the basis of a derivative value of the signal, and adjusting a light reception level of the light receiving device 3 will be described.

Figure 9:
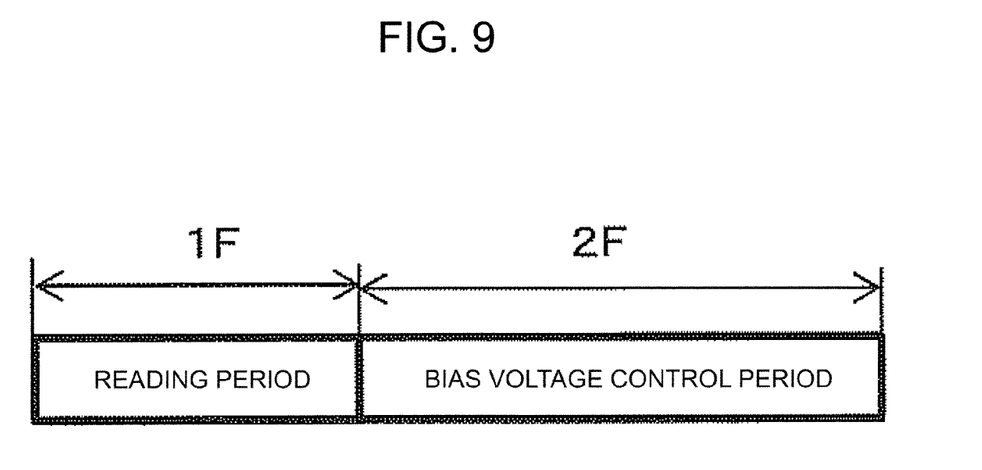
FIG. 9 illustrates a bias voltage control sequence.

FIG. 9 illustrates a bias voltage control sequence. Here, a case where the variable reflection angle mirror 2 is scanned two-dimensionally and a bias voltage is controlled for each frame will be described as an example.

First, the bias voltage control sequence is configured by a reading period and a bias voltage control period. In the reading period, a target bias voltage applied to the next frame is stored as data in accordance with a relationship between an applied bias voltage and a value calculated on the basis of signals from the light receiving device 3. In the bias voltage control period, the target bias voltage obtained in the reading period is applied to the light receiving device 3.

Figure 10:
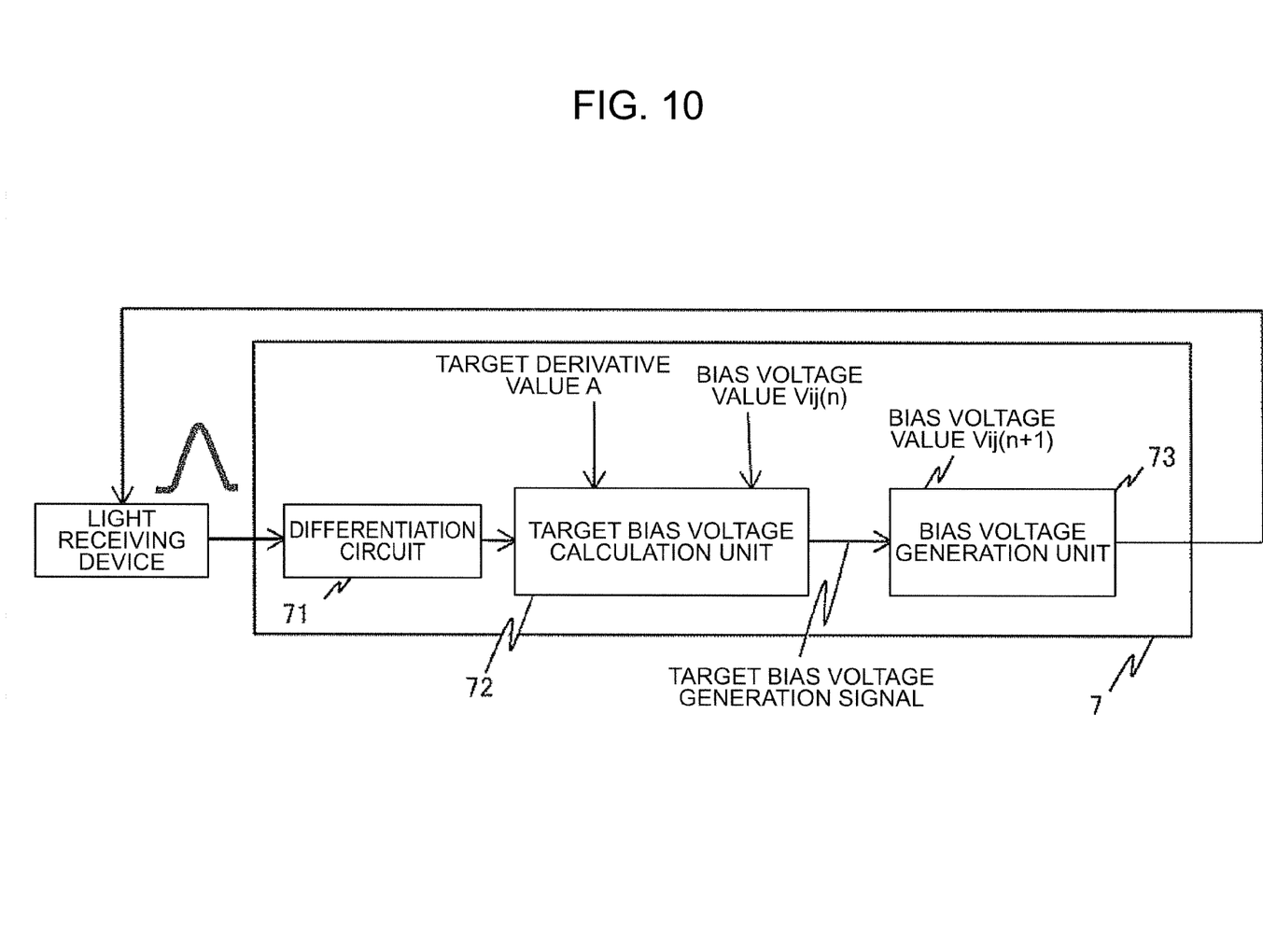
FIG. 10 illustrates a circuit configuration of the amplification factor control unit 7.

FIG. 10 illustrates a circuit configuration of the amplification factor control unit 7. A configuration of the amplification factor control unit 7 is illustrated. The amplification factor control unit 7 is configured by a differentiation circuit 71, a target bias calculation unit 72, and a bias voltage generation unit 73. An output from the light receiving device 3 is input to the differentiation circuit 71 and a derivative value of an input waveform is output to the target bias calculation unit 72. The target bias voltage calculation unit 72 calculates a target bias voltage generation signal on the basis of an output signal from the differentiation circuit 71, a target derivative value, and further a bias voltage value. In the bias voltage control period, the bias voltage generation unit 73 generates a bias voltage according to the target bias voltage generation signal.

Here, the target derivative value, the bias voltage value, and the target bias voltage value in FIG. 10 are set to A, Vij(n), and Vij(n+1), respectively. Here, i and j denote resolution, i denotes a column number, j denotes a line number, and n denotes the number of frames. That is, Vij(n) denotes a bias voltage value in an n-th frame at the time of irradiating laser on an i column and a j line. The target bias voltage calculation unit 72 may convert an input signal to a digital value by using an AD converter, calculate the target bias voltage generation signal by using the digital value, or use only a maximum value of the input signal for calculation.

Figure 11:
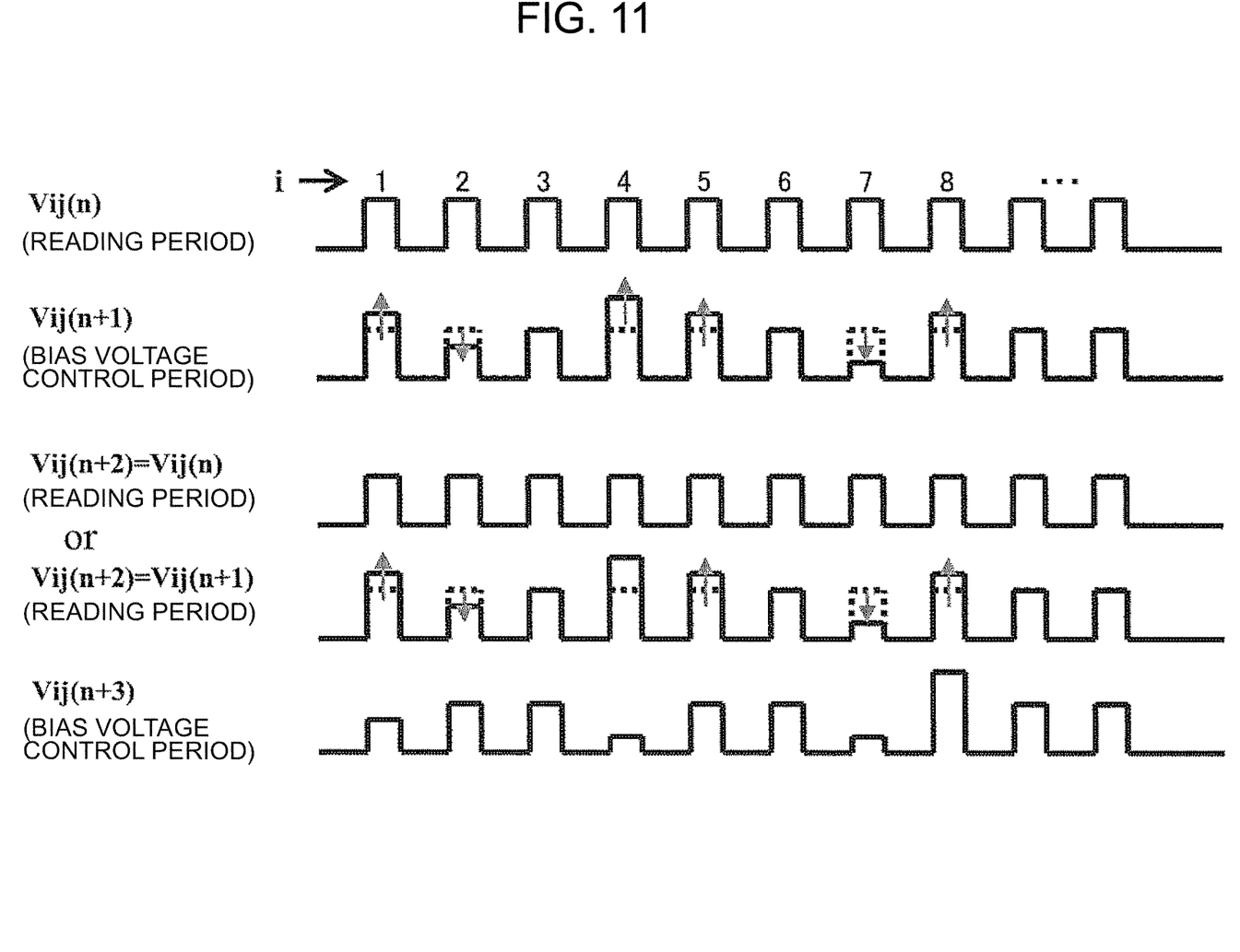
FIG. 11 illustrates a method for controlling a bias voltage Vij(n) in a reading period and a bias voltage control period.

FIG. 11 illustrates a method for controlling the bias voltage value Vij(n) in the reading period and the bias voltage control period. A longitudinal column illustrates a bias voltage in the reading period of an even-numbered frame and a bias voltage in the bias voltage control period of an odd-numbered frame. A horizontal axis illustrates values of the i column.

First, a constant bias voltage is applied also to any column at an n-th frame. Next, on the basis of the applied voltage in the n-th frame, the bias voltage generated by the amplification factor control unit 7 is applied to any column at an (n+1)-th frame. In the reading period of an (n+2)-th frame, a constant voltage may be used, or a voltage in the (n+1)-th frame may be used.

In the present embodiment, control is performed for each frame. Further, when the bias voltage control period is provided in every other frame, data for each point is accurately measured and resolution is high. However, since control is performed once at two frames, a response speed is reduced by half.

For an application in which a higher response speed is required, control may be performed for each line or for each pixel. For example, data read at j-th line (or i-th column) may be applied to (j+1)-th line (or (i+1)-th column) as a bias voltage. In this case, the resolution is set to i*j/2 (or i/2*j), however, since an optimum bias voltage is applied for each frame, the above-described control is appropriate for the application in which a higher response speed is required.

Second Embodiment

A second embodiment of the present invention will be described with reference to FIG. 12. The present embodiment differs from the first embodiment, and intensity of the light source 1 is controlled and a light reception level of the light receiving device 3 is adjusted.

Figure 12:
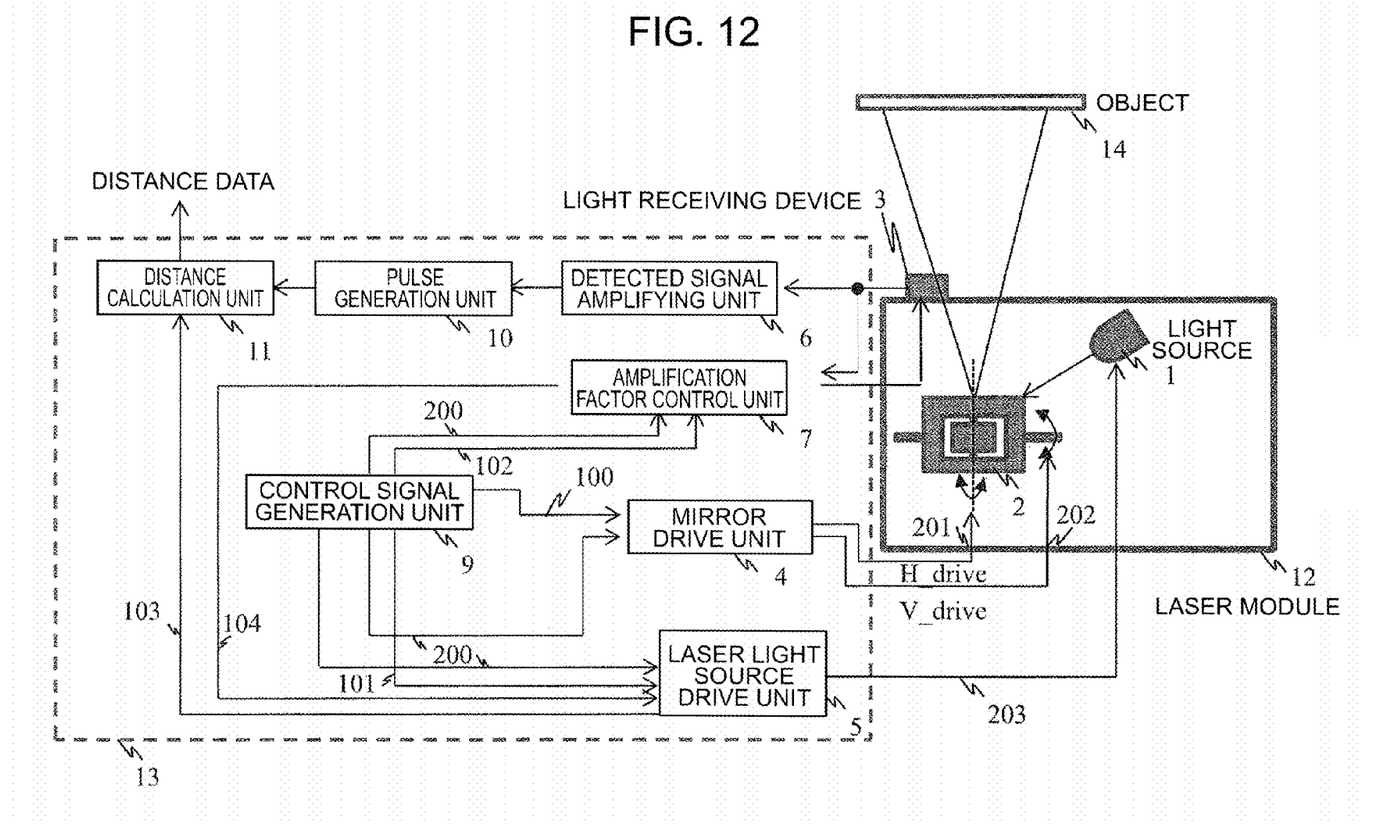
FIG. 12 illustrates a configuration according to another embodiment of the present invention.

FIG. 12 illustrates a configuration of the second embodiment. The second embodiment differs from the first embodiment in that a laser intensity control signal 104 being an output from the amplification factor control unit 7 is input to the laser light source drive unit 5. Hereinafter, a configuration of the amplification factor control unit 7 of the second embodiment will be described with reference to FIG. 13.

Figure 13:
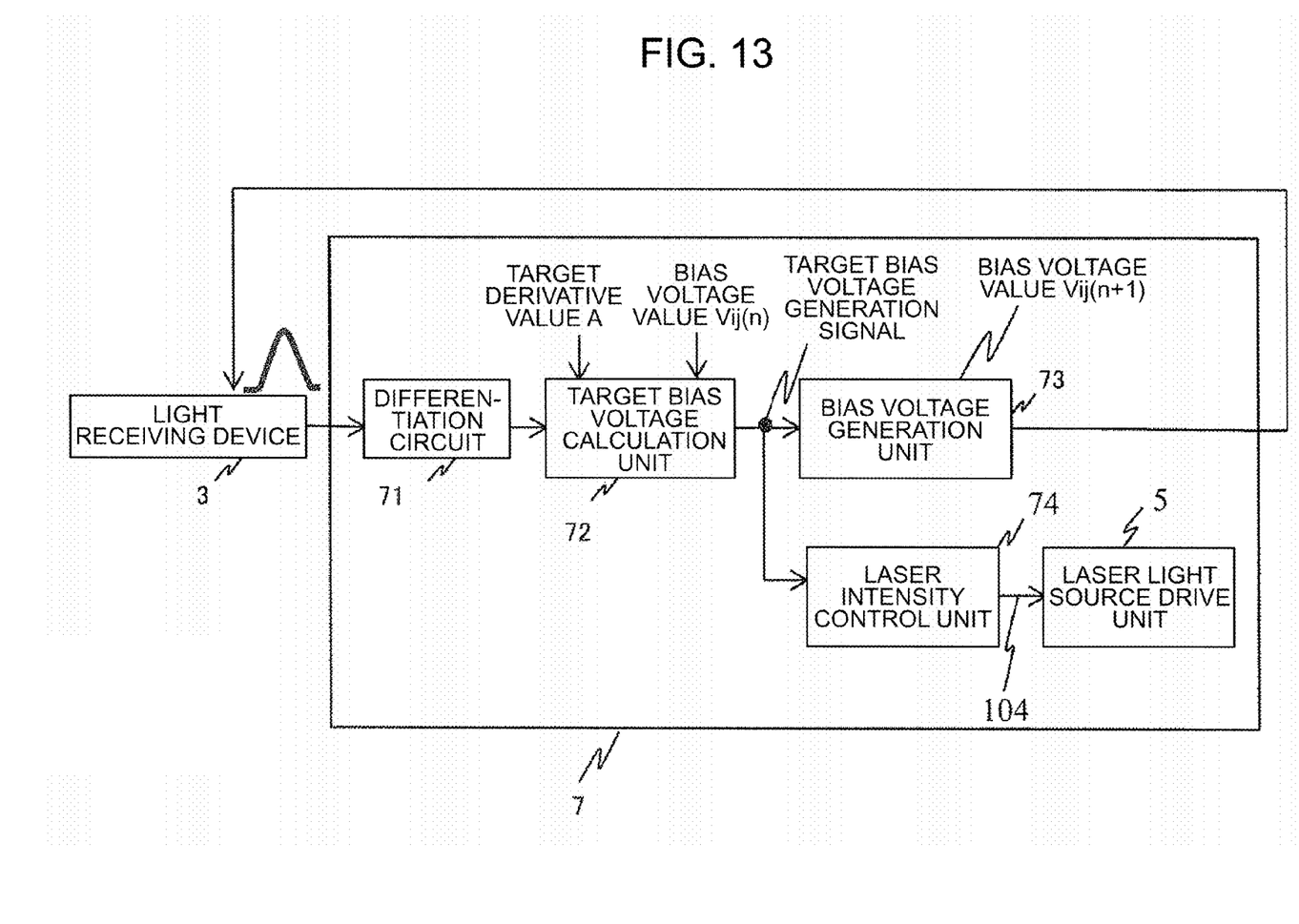
FIG. 13 illustrates a configuration of the amplification factor control unit 7 according to the another embodiment of the present invention.

FIG. 13 illustrates a configuration of the amplification factor control unit 7 of the second embodiment. The second embodiment differs from the first embodiment in that a laser intensity control unit 74 is added. The laser intensity control unit 74 generates a signal for actuating the laser light source drive unit 5 from the target bias voltage generation signal.

The laser intensity control unit 74 may transmit a signal to be added to the laser light source drive unit 5 to control a current, or control an applied voltage to an anode of the light source 1. Further, a current according to the target bias generation signal may be generated by using the laser intensity control unit 74. The laser intensity control unit 74 may be configured to control laser intensity.

Further, the laser intensity control unit 74 may control not only the laser intensity but also the bias voltage of the light receiving device 3 may be used. When a unit that adjusts a light reception level in the light receiving device 3 is provided, a plurality of units may be used.

In the above-described embodiments, a case where the APD is used as the light receiving device 3 is described. Further, the light receiving device 3 should be just a light receiving sensor that can adjust an amplification factor of the light receiving device 3 from the outside, in other words, the light receiving device 3 should be just a light receiving sensor that can adjust sensitivity. The light receiving device 3 is not limited to the APD.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An optical distance measuring apparatus for irradiating ranging light on a measuring object and receiving light reflected from the measuring object to measure a distance up to the measuring object, comprising:
   a light source configured to emit ranging light;
   a variable reflection angle mirror configured to scan the ranging light on the measuring object;
   a light receiving device configured to receive light reflected from the measuring object of the ranging light and output signal in accordance with intensity or light quantity of the reflected light;
   a detected signal amplifying unit configured to amplify an output signal from the light receiving device;
   an amplification factor control unit configured to generate or calculate a target bias voltage to control the light sensitivity of the light receiving device based on the output signal from the light receiving device, wherein the amplification factor control unit includes a differentiation circuit configured to differentiate the output signal from the light receiving device, and further configured to generate or calculate the target bias voltage based on the output signal from the differentiation circuit; and
   a distance calculation unit configured to detect a flight time of the ranging light based on the output signal from the detected signal amplifying unit and calculate a distance up to the measuring object, wherein
   in a first scan period, the amplification factor control unit is configured to generate or calculate the target bias voltage based on the output signal from the light receiving device, and
   in a second scan period, the detected signal amplifying unit is configured to control the light sensitivity of the light receiving device by the target bias voltage generated or calculated in the first scan period and the distance calculation unit is configured to calculate a distance up to the measuring object.

2. The optical distance measuring apparatus according to claim 1, wherein
   the variable reflection angle mirror is configured to scan ranging light two-dimensionally, and
   the first scan period and the second scan period are switched for each of the two dimensional scan frames.

3. The optical distance measuring apparatus according to claim 1, wherein
   the variable reflection angle mirror is configured to scan ranging light two-dimensionally, and
   the first scan period and the second scan period are switched for each of the two dimensional scan lines.

4. The optical distance measuring apparatus according to claim 1, wherein
   the variable reflection angle mirror is configured to scan ranging light one-dimensionally, and
   the first scan period and the second scan period are switched for each of the one dimensional scan lines.

5. The optical distance measuring apparatus according to claim 1, wherein
   the variable reflection angle mirror is configured to scan ranging light one-dimensionally, and
   the first scan period and the second scan period are switched for each predetermined resolution of the one-dimensional scan lines.

6. The optical distance measuring apparatus according to claim 1, wherein the detected signal amplifying unit includes an amplifier and/or an offset removal unit.

7. The optical distance measuring apparatus according to claim 1, wherein the light receiving device is an avalanche photo diode.

8. The optical distance measuring apparatus according to claim 1, wherein the light source is a laser.

9. The optical distance measuring apparatus according to claim 8, wherein a wavelength of the laser is in an infrared region.

* * * * *